(12) United States Patent
Kubo

(10) Patent No.: US 7,671,896 B2
(45) Date of Patent: Mar. 2, 2010

(54) IMAGE SENSING APPARATUS

(75) Inventor: Ryoji Kubo, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 10/702,200

(22) Filed: Nov. 4, 2003

(65) Prior Publication Data

US 2004/0090537 A1    May 13, 2004

(30) Foreign Application Priority Data

Nov. 7, 2002  (JP)  ............................ 2002-324167

(51) Int. Cl.
*H04N 5/228* (2006.01)
*H04N 9/73* (2006.01)
*H04N 5/222* (2006.01)

(52) U.S. Cl. ............. 348/222.1; 348/223.1; 348/333.01

(58) Field of Classification Search ............. 348/223.1, 348/224.1, 333.03, 333.11; 382/303, 304
See application file for complete search history.

(56) References Cited

U.S. PATENT DOCUMENTS

| | | | |
|---|---|---|---|
| 5,619,347 A * | 4/1997 | Taniguchi et al. ............ 358/516 |
| 6,137,534 A * | 10/2000 | Anderson ................. 348/222.1 |
| 6,710,807 B1 | 3/2004 | Yamagishi | |
| 6,847,388 B2 * | 1/2005 | Anderson .................... 715/854 |
| 6,961,085 B2 * | 11/2005 | Sasaki ...................... 348/222.1 |
| 6,963,374 B2 * | 11/2005 | Nakamura et al. ...... 348/333.11 |
| 6,967,680 B1 * | 11/2005 | Kagle et al. .............. 348/222.1 |

| | | | |
|---|---|---|---|
| 2002/0033887 A1 * | 3/2002 | Hieda et al. .................. 348/220 |

FOREIGN PATENT DOCUMENTS

| JP | 11-331744 A | 11/1999 |
|---|---|---|
| JP | 2000-156802 A | 6/2000 |
| JP | 2000-201294 A | 7/2000 |
| JP | 2000-224466 A | 8/2000 |
| JP | 2002-218479 A | 8/2002 |
| JP | 2002-247590 A | 8/2002 |

OTHER PUBLICATIONS

The above references were cited in a Jun. 16, 2009 Japanese Office Action that issued in Japanese Patent Application No. 2007-076629, which is enclosed without translation.

* cited by examiner

*Primary Examiner*—Sinh Tran
*Assistant Examiner*—Albert H Cutler
(74) *Attorney, Agent, or Firm*—Cowan, Liebowitz & Latman, P.C.

(57) ABSTRACT

An object of this invention is to provide an image sensing apparatus which shortens the photographing interval in single shooting and sequential shooting. To achieve this object, an image signal corresponding to an object image is read from an image sensing element to output image data by the processes of a signal processing circuit and A/D converter. An image processing circuit integrates the image data output from the image sensing element for white balance processing. An image display circuit performs processing of displaying on a display an object image during imaging on the image sensing element. A system controller so controls as to cause the image processing circuit to perform integral processing of the image data for the white balance during read of an image signal from the image sensing element, and cause the display to display the object image after integral processing ends.

2 Claims, 7 Drawing Sheets

IMAGE SENSING APPARATUS

FIELD OF THE INVENTION

The present invention relates to an image sensing apparatus which converts an object image into an image signal by an image sensing element to generate image data, records the image data on a detachable recording medium, and outputs, to a display device, image data of an object image during imaging on the image sensing element or image data recorded on the recording medium after photographing.

BACKGROUND OF THE INVENTION

The operation of an electronic camera will be explained as an example of a conventional image sensing apparatus.

FIG. 7 is a timing chart showing image sensing operation of a conventional electronic camera.

When an image sensing/recording instruction is issued by pressing a switch (e.g., shutter button), the electronic camera drives the shutter to perform exposure, and after exposure of a proper period, reads an image signal from the image sensing element. The image signal from the image sensing element is converted into image data via an A/D converter, and the image data is stored in the internal memory of the electronic camera or the like. Image data in the memory (stored in the memory) is corrected (scratch correction). The image sensing element may include a defective pixel, and this processing compensates for the defective pixel.

Image data in the memory is read out again, and subjected to data processing and calculation such as integration in order to perform white balance processing. This is a known technique, and a detailed description thereof will be omitted. Image processing is done with a white balance coefficient obtained by calculation. Image data (to be referred to as recording image data hereinafter) which is compressed after conversion into YUV data is stored in the memory again. At the same time, the YUV data is resized small, also compressed, and stored in the memory.

Various photographing condition data are also added and stored in the memory. Processing for the photographed image data is completed, and these data are recorded in association with photographed image data on a recording medium detachable from the electronic camera. The compressed recording image data is decompressed again, resized to a size suitable for display on a display device, and then displayed, so as to allow confirming image data recorded on the recording medium immediately after photographing on the display device such as the liquid crystal display of the electronic camera.

Some electronic cameras comprise a sequential shooting function of sensing a plurality of successive images by pressing the shutter button once. In sequential shooting, the above operation of obtaining recording image data is repeated to obtain successive recording image data. When the white balance coefficient is commonly used for the second and subsequent images attained by sequential shooting, data processing and calculation for performing white balance processing are executed for only the first image data of sequential shooting. Also in sequential shooting, a photographed image can be confirmed on the display device or the like. Similarly, compressed photographed image data is decompressed again, resized to a size suitable for display on the display device, and displayed.

However, the above-described processing in the electronic camera takes a long time until one photographing processing ends. The next photographing cannot be quickly executed, and a desired shutter chance may be missed. Also in sequential shooting, the sequential shooting interval becomes long. Display of a photographed image on the display device in sequential shooting prolongs the time interval after which the next photographing becomes possible. Still images after photographing are sequentially updated and displayed on the display device of the electronic camera every sequential shooting. It is, therefore, very difficult to perform sequential shooting while following an object by only the display device. In the following description, normal photographing will be called single shooting (photographing) with respect to sequential shooting (photographing).

SUMMARY OF THE INVENTION

The present invention has been made in consideration of the above situation, and has as its object to provide an image sensing apparatus which shortens the photographing interval in single shooting and sequential shooting.

It is another object of the present invention to provide an image sensing apparatus capable of displaying successive image data on a display device in sequential shooting.

To achieve the above objects, according to the first aspect of the present invention, an image sensing apparatus comprises an image sensing device which outputs image data obtained by an image sensing element, a white balance integration device which integrates the image data output from the image sensing device for white balance processing, a display device which displays an object image during imaging on the image sensing element, and a control device which causes the white balance integration device to perform integral processing for the image data during read of an image signal from the image sensing element, and causes the display device to display the object image at least after the integral processing ends.

According to the second aspect of the present invention, an image sensing apparatus comprises an image sensing device which reads an image signal corresponding to an object image from an image sensing element, and outputs first image data, a white balance integration device which integrates the first image data output from the image sensing device for white balance processing, a display device which displays the object image during imaging on the image sensing element, an image processing device which generates second image data on the basis of the first image data output from the image sensing device, and a control device which causes the white balance integration device to perform integral processing for the first image data during read of the image signal from the image sensing element, causes the image processing device to perform image processing of previous image data before the first image, and causes the display device to display the object image during imaging on the image sensing element after the integral processing and the image processing end.

The image sensing apparatus according to the present invention omits processes in photographing, compared to a conventional apparatus, and thus can shorten the photographing sequence. An object image can be displayed on an electronic viewfinder (display device) immediately after photographing. The user can quickly follow the object through the electronic viewfinder, obtaining comfortable operability. This can prevent a miss of a shutter chance due to slow display of an object image.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

An electronic camera as an image sensing apparatus according to an embodiment of the present invention will be described with reference to the accompanying drawings.

Figure 1:
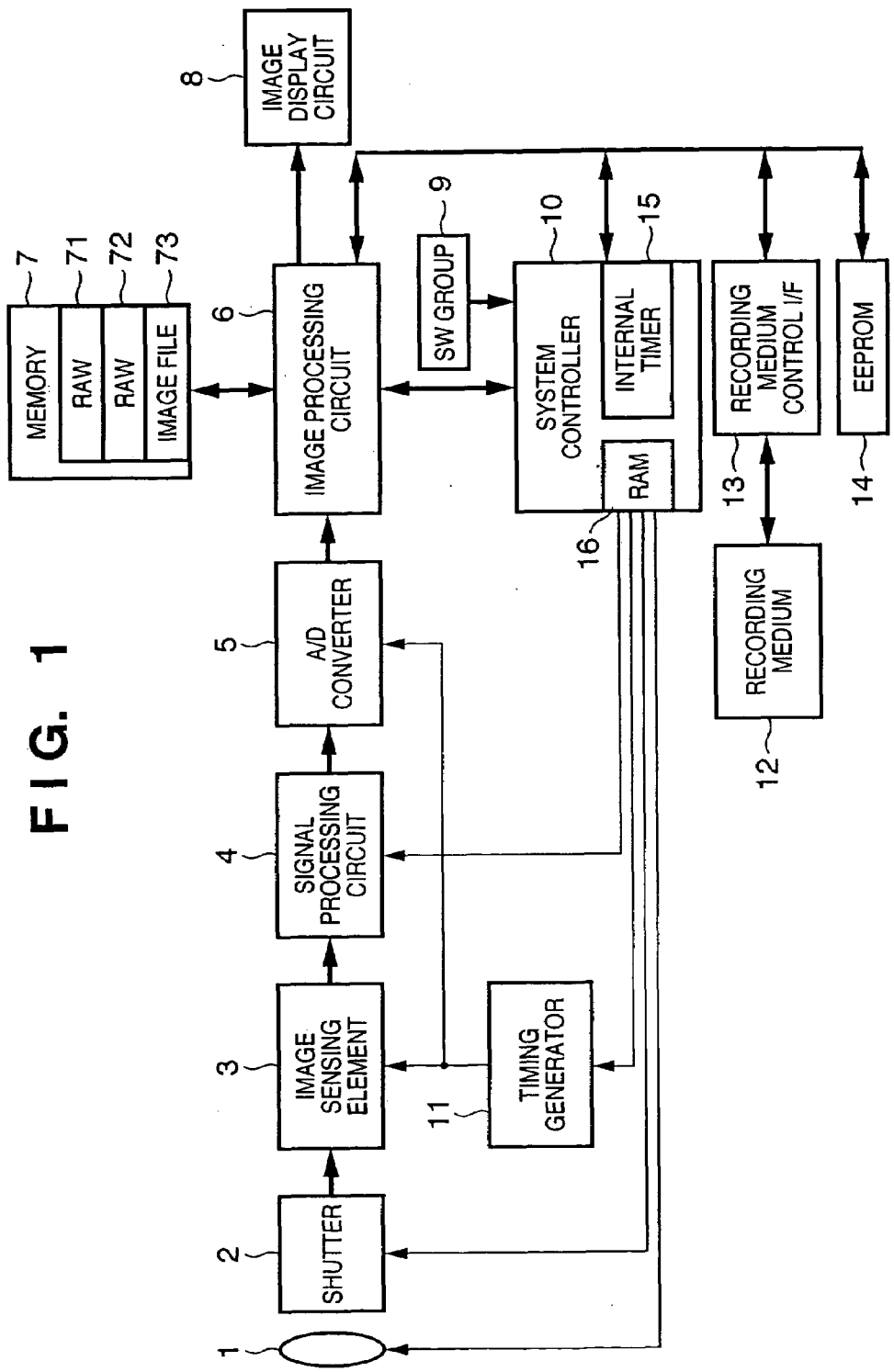
FIG. 1 is a block diagram showing the schematic arrangement of an electronic camera according to an embodiment of the present invention.

FIG. 1 is a block diagram showing the schematic arrangement of the electronic camera according to the embodiment of the present invention. The electronic camera of the embodiment converts an object image into an electrical signal, and records the signal as image data on a detachable recording medium. In FIG. 1, reference numeral 1 denotes a lens for forming an object image on an image sensing element 3 to be described later. Reference numeral 2 denotes a shutter which adjusts the exposure amount to the image sensing element 3. The image sensing element 3 outputs an image signal corresponding to an object image formed on the light-receiving surface via the lens 1 after photoelectric conversion. Color filters in several colors (e.g., red, green, and blue) are attached to pixels arrayed on the light-receiving surface (image sensing surface) of the image sensing element 3, and limit the waveband of transmitted light.

Reference numeral 4 denotes a signal processing circuit which performs various processes such as correction and clamping for an image signal output from the image sensing element 3. Reference numeral 5 denotes an A/D converter which converts an image signal (analog signal) output from the signal processing circuit 4 into a digital signal. Reference numeral 6 denotes an image signal processor which performs various processes for image data (digital signal) input from the A/D converter 5 and compresses/decompresses the image data. Image data input from the A/D converter 5 will be called RAW image data, whereas image data after various processes and compression/decompression by the image signal processor 6 will be called recording image data. RAW image data and recording image data will be discriminated in the following description. RAW image data is image data in which color information of each pixel output from the image sensing element 3 is not processed. Recording image data is image data which is compressed/decompressed in order to record the data on a recording medium (to be described later) detachable from the electronic camera.

Reference numeral 7 denotes a memory which stores RAW image data, recording image data, and various data. The memory 7 has RAW image data areas 71 and 72 which store RAW image data of at least two images. The memory 7 also has an image file area 73 for temporarily storing recording image data of a plurality of images immediately before recording on the recording medium to be described later.

Reference numeral 8 denotes an image display circuit which comprises a display device such as a liquid crystal display attached to or mounted on the electronic camera main body. When RAW image data is input from the A/D converter 5 or memory 7 via the image processing circuit 6, the image display circuit 8 performs processing for displaying an image corresponding to the RAW image data on the display device. An example of the display device is an electronic viewfinder (to be referred to as an EVF hereinafter) for confirming an object image formed on the light-receiving surface of the image sensing element 3 in photographing or recorded image data. Note that the present invention is not limited to the form in which the image display circuit comprises the display device, like the embodiment, but is also applied to a form in which an image is displayed on a display device that receives a video signal output from the electronic camera. Reference numeral 11 denotes a timing generator which outputs various timing signals to the image sensing element 3 and A/D converter 5.

Reference numeral 9 denotes a switch group which is formed by a plurality of switches for designating various operations and operation modes of the electronic camera. The state of the switch group 9 is detected by a system controller 10 to be described later. The form of the switch group 9 (push button, dial, or the like) preferably includes various forms in accordance with a corresponding function, design, and the like. The switch group 9 includes switches for designating at least a power-off mode, recording mode, and playback mode as the operation mode of the electronic camera. The switch group 9 also functions as at least a recording medium lid detection device which detects a recording medium 12 to be described later, and a battery lid detection device which detects opening/closing of a lid (not shown) that covers an electronic camera battery.

The system controller 10 is comprised of a CPU (Central Processing Unit) which controls the whole electronic camera in accordance with a program, a memory, and the like. As shown in FIG. 1, the system controller 10 comprises an internal timer 15 which is a timer serving as the reference of timing control, and a RAM 16 serving as a memory which temporarily stores information processed by the CPU. Reference numeral 14 denotes an EEPROM which is a nonvolatile memory for storing the operation program of the system controller 10. The recording medium 12 is a detachable recording medium for recording or reading out the above-described recording image data. Reference numeral 13 denotes a recording medium I/F (interface) which interfaces data between the recording medium 12 and the electronic camera.

<Description of Operation in EVF (Electronic ViewFinder) Mode>

An electronic viewfinder mode in which the user confirms an object in photographing with the electronic camera having the above arrangement will be explained. If the electronic viewfinder mode is designated by the switch group 9, the system controller 10 opens the shutter 2. The timing generator 11 controls the exposure time of the image sensing element 3 and the charge read timing, and generates a timing signal for realizing an electronic shutter so as to obtain correct exposure with light received by opening the shutter 2. An image signal output from the image sensing element 3 undergoes various processes such as gain correction and clamping for each color by the signal processing circuit 4. The image signal is converted into RAW image data by A/D conversion of the A/D converter 5.

The image processing circuit 6 performs various signal processes and resizing for displaying an image on the EVF, and the processed image data is temporarily stored in the memory 7. The image data stored in the memory 7 is read out again, and displayed on the EVF after processing by the image display circuit 8. The operation from read from the image sensing element 3 to image display on the EVF is repeated in real time to realize the electronic viewfinder mode.

<Description of Single Shooting>

Figure 2:
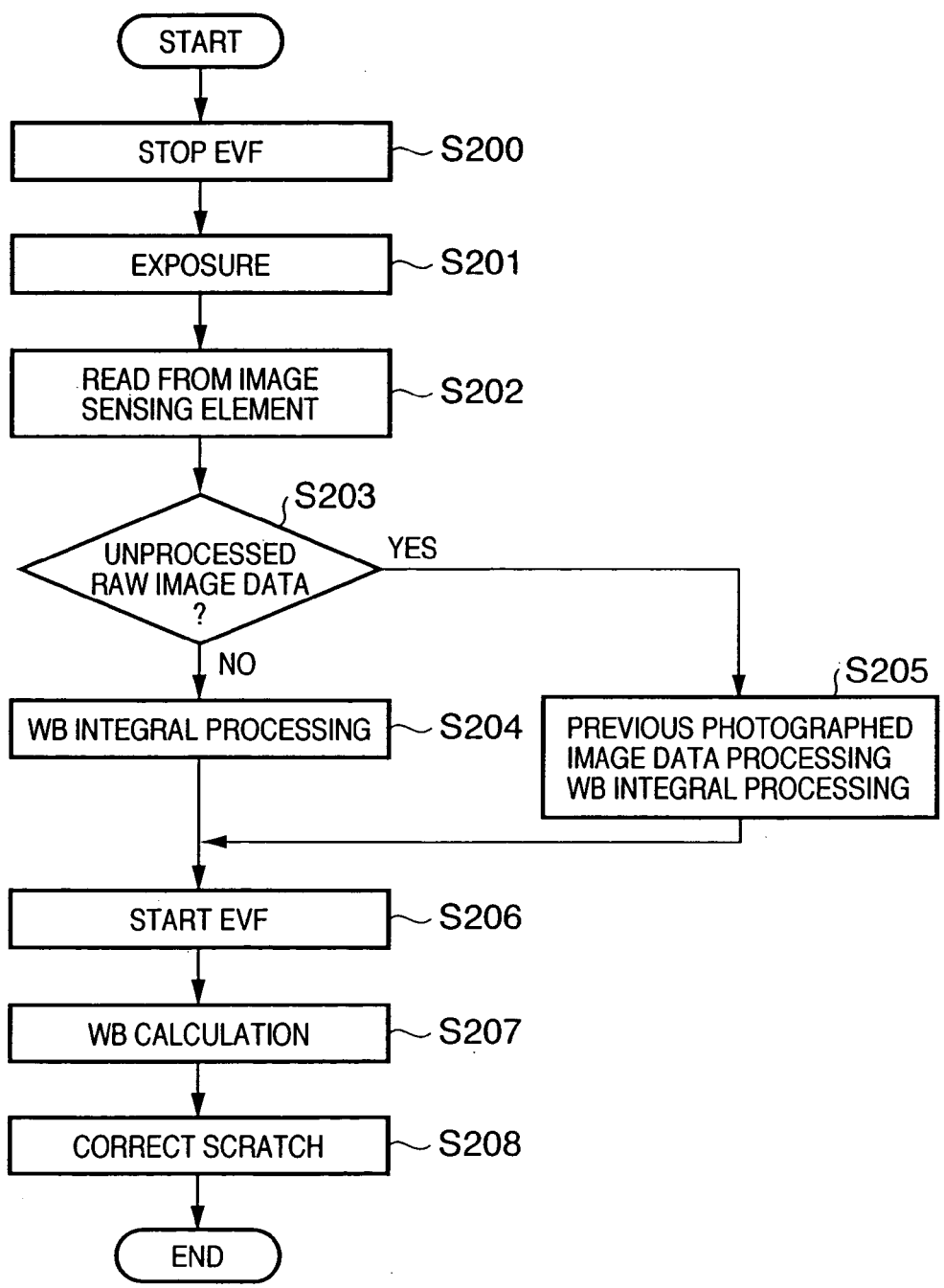
FIG. 2 is a flow chart showing normal photographing operation of the electronic camera shown in FIG. 1.

Normal photographing (single shooting) of the electronic camera shown in FIG. 1 will be explained with reference to the accompanying drawings. FIG. 2 is a flow chart showing normal photographing operation of the electronic camera shown in FIG. 1. Processing in FIG. 2 starts on the assumption that the electronic camera is ON and an object image formed on the image sensing element 3 is displayed on the EVF. An operation in the first (first image) photographing after the electronic camera is activated will be described. Read of RAW image data from the image sensing element 3 is read of all pixels. Read of image data for the EVF display is interlaced read and/or cumulative read. In the EVF display, the read method is switched by a read switching circuit (not shown).

For example, if the user operates the switch group 9 to issue an image sensing/recording instruction to the system controller 10, the electronic camera shown in FIG. 1 starts the following image sensing/recording processing under the control of the system controller 10. As shown in FIG. 2, the electronic camera stops the EVF display in step S200. This is because supply of video data to the image display circuit 8 stops by controlling the image processing circuit 6 by the system controller 10.

In step S201, the system controller 10 starts actual exposure operation by driving the shutter 2 in order to obtain an image to be recorded on the recording medium 12. In step S202, the system controller 10 controls the timing generator 11 so as to start read of image signals from the image sensing element 3 after exposure of a proper period. The read image signals undergo various processes such as gain correction and clamping for each color by the signal processing circuit 4. The image signals are A/D-converted by the A/D converter 5, and sequentially stored in either the RAW image data area 71 or 72 of the memory 7 via the image processing circuit 6. The image processing circuit 6 stores RAW image data in the RAW image data area 71 or 72 of the memory 7 without any signal processing or the like. The RAW image data area 71 or 72 of the memory 7 substantially directly stores image data obtained by digitizing an image signal output from the image sensing element 3.

In step S203, the presence/absence of RAW image data which has already been stored in the RAW image data area 71 or 72 of the memory 7 is determined during read from the image sensing element 3. In this case, the first photographing after activation of the electronic camera is assumed. No stored RAW image data exists (NO in step S203), and the processing advances to step S204. In step S204, RAW image data which are sequentially stored in the RAW image data area 71 or 72 of the memory 7 are read out. In order to perform white balance (to be referred to as WB hereinafter) processing, RAW image data corresponding to the color filters of the image sensing element 3 are integrated by the image processing circuit 6 (WB integral processing). WB integral processing data are stored in the memory 7 again.

Figure 5A:
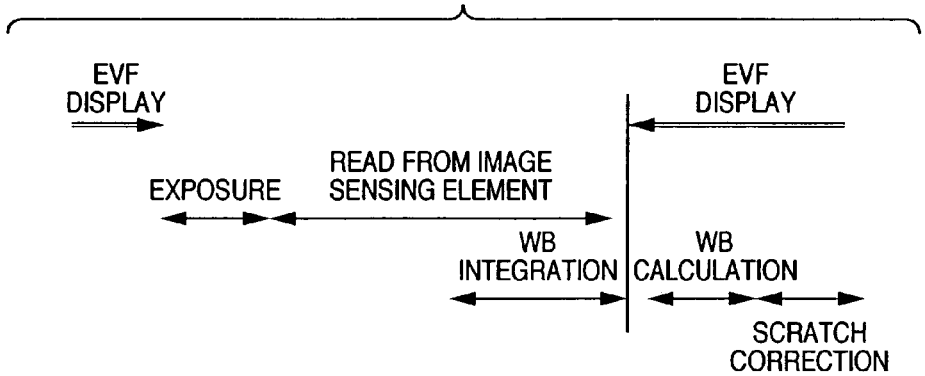
FIGS. 5A and 5B are timing charts showing image sensing processing in single shooting in the use of an interlaced read type image sensing element 3.

Note that the image sensing element 3 generally has two types depending on the image signal read method: an interlaced read type in which data are read out from two fields (first and second fields) every other line, and a non-interlaced read type in which data are sequentially read out every line. FIG. 5A is a timing chart showing image sensing processing in the use of an interlaced read type image sensing element 3. As shown in FIG. 5A, in read of RAW image data from the image sensing element 3, data of all pixels serving as a frame are obtained at the start of reading out data from the second field. At this time, WB integral processing starts.

In the use of a non-interlaced read type image sensing element 3, data of all pixels serving as a frame are obtained at the start of reading out RAW image data from the image sensing element 3. At this time, WB integral processing can start. In either case, RAW image data based on an image signal read out from the image sensing element 3 is stored in the RAW image data area 71 or 72 of the memory 7. At the same time, WB integral processing is executed while the stored RAW image data is read out from the same RAW image data area 71 or 72 of the memory 7. The system controller 10 and image processing circuit 6 so control as to prevent read from exceeding write.

At the end of WB integral processing, EVF display processing starts in step S206. This display processing is realized such that the F-number of the electronic camera, the electronic shutter speed, and the WB coefficient are defined to have the same states as those immediately preceding photographing as default settings. In step S207, the system controller 10 executes WB calculation using WB integral processing data, and determines the WB coefficient of an image obtained in actual exposure operation.

In step S208, the electronic camera performs processing corresponding to a pixel scratch (defective pixel) of the image sensing element 3. The image sensing element 3 may include a defective pixel, and this processing compensates for the defective pixel. More specifically, defective pixel data is extracted from RAW image data stored in the RAW image data area 71 or 72 of the memory 7, and corrected. As the defective pixel correction method, various correction methods which are currently available can be preferably adopted. By the above operation, the electronic camera ends photographing operation for the first image data.

Photographing operation for the second and subsequent images in normal photographing of the electronic camera shown in FIG. 1 will be explained with reference to FIG. 2.

If an image sensing/recording instruction for the second image is generated to the system controller 10, similar to photographing of the first image, the electronic camera stops the EVF display in step S200. The shutter 2 is driven in step S201, and after exposure of a proper period, read of image signals from the image sensing element 3 starts in step S202.

The image signals undergo various processes such as gain correction and clamping for each color by the signal processing circuit 4, and A/D-converted by the A/D converter 5. The image signals are sequentially stored in either the RAW image data area 71 or 72 of the memory 7 via the image processing circuit 6. Assuming that RAW image data of previous photographing are stored in the first area (e.g., RAW image data area 71) out of the RAW image data areas 71 and 72 of the memory 7, RAW image data in photographing of the second image are stored in the second area (e.g., RAW image data area 72).

Figure 5B:
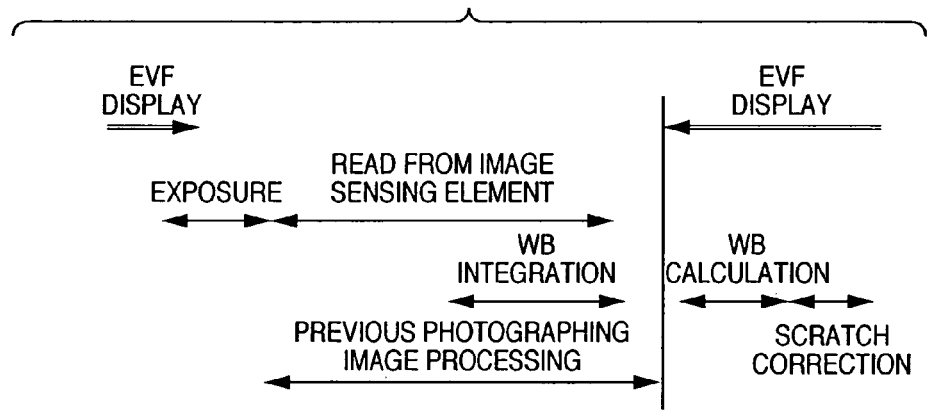

In step S203, the presence/absence of RAW image data which has already been stored in the memory 7 is determined during read from the image sensing element 3. Since photographing of the second image is assumed, RAW image data of previous photographing has been stored (YES in step S203). In step S205, the image processing circuit 6 performs image processing for RAW image data obtained in the first photographing. At the same time, the image processing circuit 6 reads out again RAW image data of the current photographing (second image) which has been stored in the RAW image data area 72 of the memory 7, and executes WB integral processing. The start timing of WB integral processing for RAW image data of the second image is the same as that in photographing of the first image, as shown in FIG. 5B. The timing at which the image processing circuit 6 starts image processing for RAW image data of the first image is determined in accordance with the start of read from the image sensing element 3, as shown in FIG. 5B.

In this image processing, similar to, e.g., developing processing of generating a JPEG image from RAW image data, the image processing circuit 6 reads out RAW image data of previous photographing that has been stored in the memory 7, performs image processing with a WB coefficient calculated in previous photographing, converts the image data into YUV data, compresses the data, and then stores the data in the image file area 73 of the memory 7. At the same time, the YUV data is resized small, also compressed, and stored as a thumbnail image in the image file area 73 of the memory 7. Various photographing condition data are also added and also stored in the image file area 73 of the memory 7. As a result, the image file of previous photographing is completed in the image file area 73. The image file structure has a known standard and complies with it, details of which will not be described.

When only RAW image data is recorded without generating any JPEG image, the image processing circuit may execute lossless compression processing for the RAW image data.

At the end of both WB integral processing and image processing of RAW image data of previous photographing, the electronic camera starts EVF display processing in real-time photographing in step S206. At this time, the F-number, electronic shutter speed, and WB coefficient are changed to the same settings as those immediately before photographing. In step S207, the system controller 10 executes WB calculation using WB integral processing data, and determines the WB coefficient of an image obtained in actual exposure operation. In step S208, in order to cope with a pixel scratch of the image sensing element 3, RAW image data stored in the RAW image data area of the memory 7 is corrected. Accordingly, the electronic camera ends photographing operation for the second image.

At this time, RAW image data of the second image has been stored in the RAW image data area 71 or 72 of the memory 7, and the image file of the first image has been stored in the image file area 73 of the memory 7. After that, the electronic camera reads out the image data file of previous photographing from the image file area 73 of the memory 7, and records the data on the recording medium 12 via the image processing circuit 6 and recording medium control I/F 13.

In the above description, image processing for RAW image data of previous photographing is done in step S205. Of this image processing, processing of creating a thumbnail image, addition of various photographing condition data, and processing of storing data in the image file area 73 of the memory 7 may be performed after the start of EVF display processing in step S206. Alternatively, these processes may be performed after any one of steps S206, S207, and S208.

Photographing operation of the electronic camera for the third and subsequent images is also the same as that for the second image. Since RAW image data of previous (second image) photographing is stored in the second area (e.g., RAW image data area 72) out of the RAW image data areas of the memory 7, RAW image data of the third image is stored in the first area (e.g., RAW image data area 71) out of the RAW image data areas of the memory 7. The electronic camera alternately stores acquired RAW image data in the RAW image data areas 71 and 72 of the memory 7. Thereafter, image file data of previous photographing is read out from the image file area 73 of the memory 7, and recorded on the recording medium 12 via the image processing circuit 6 and the recording medium control I/F 13.

As described above, at the end of photographing of the nth (n is an integer of 1 or more) image, RAW image data of the nth image has been stored in the RAW image data area 71 or 72 of the memory 7 without any processing, and WB integral processing using RAW image data of the nth image has ended. Image file data generated by image processing for RAW image data of the (n−1)th image that has been stored in the memory 7 is stored in the image file area 73.

Electronic camera operation for preventing a situation in which, for example, RAW image data stored in the memory 7 is lost (or may be lost) at the end of the above-described photographing operation will be described.

Figure 3:
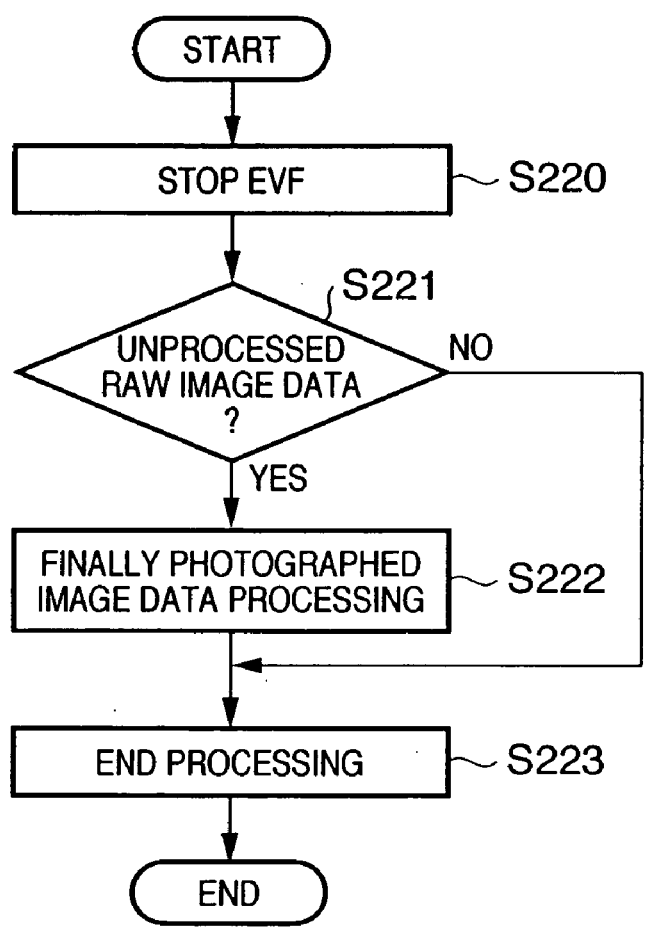
FIG. 3 is a flow chart showing processing for RAW image data saved in a memory 7 in the electronic camera shown in FIG. 1.

FIG. 3 is a flow chart showing processing for RAW image data saved in the memory 7 in the electronic camera shown in FIG. 1. Processing shown in FIG. 3 is executed when the electronic camera changes to the following states or situations 1 to 6.

1. The system controller 10 is instructed via the switch group 9 to power off the electronic camera.

2. The system controller 10 is instructed via the switch group 9 of a change of the photographing mode or a mode other than the photographing mode. Note that the mode other than the photographing mode is, e.g., a playback mode in which an image recorded on the recording medium 12 is played back, a PC mode in which the electronic camera is connected to an external computer to transfer data, or a setup mode in which various default settings of the device are done.

3. The internal timer 15 of the system controller 10 detects that the electronic camera has not been operated for a predetermined time, and then an auto-shutoff mechanism acts.

4. The system controller 10 detects that the power supply voltage has dropped to a predetermined level or less.

5. The system controller 10 detects that a lid which covers the recording medium 12, a battery (not shown), or both of them have been opened.

6. The system controller 10 detects that any error has occurred in the electronic camera.

In the above states or situations, the electronic camera stops the EVF display in step S220, as shown in FIG. 3. In step S221, the system controller 10 determines the presence/absence of unprocessed RAW image data in the RAW image data area 71 or 72 of the memory 7. If unprocessed RAW image data exists (YES in step S221), the processing advances to step S222 to perform finally photographed image data processing. In finally photographed image data processing, RAW image data stored in the memory 7 is temporarily read out, processed in the image processing circuit 6 with a WB coefficient calculated in final photographing, converted into YUV data, then compressed, and stored in the image file area 73 of the memory 7.

At the same time, the image processing circuit 6 resizes the YUV data small, also compresses the data, and stores it as a thumbnail image in the image file area 73 of the memory 7. Various photographing condition data are also added and also stored in the image file area 73 of the memory 7. Accordingly, the image file of the finally photographed image is completed in the image file area 73. The image file structure has a known standard and complies with it, details of which will not be described. The image file data is read out from the image file area 73 of the memory 7, and recorded on the recording medium 12 via the image processing circuit 6 and recording medium control I/F 13. Finally photographed image data processing in step S222 ends.

If, for example, the system controller 10 is instructed via the switch group 9 to power off the electronic camera after the end of recording on the recording medium 12, end processing of, e.g., turning off various power supplies of the electronic camera is executed to end power-off operation.

Also in the remaining states or situations (2 to 6 described above) in which processing in FIG. 3 is performed, processes corresponding to the respective states or situations are done after processing of unprocessed finally photographed image data and recording on the recording medium 12, similar to power-off processing. For example, if the system controller 10 is instructed via the switch group 9 of another photographing mode or a mode except the photographing mode, the system controller 10 performs processing necessary to shift to another mode or a mode except the photographing mode after image processing and recording on the recording medium 12.

When the EVF display is stopped in the electronic camera to execute photographing using only an optical viewfinder (not shown), EVF display processing shown in FIG. 2 (step S206) is not executed. In photographing using the optical viewfinder, processing of unprocessed finally photographed image data and recording on the recording medium 12 are done at the end of photographing operation (step S208) in any one of the following cases 1 to 3, similar to power-off processing.

1. The system controller 10 detects that a photographing instruction switch or photographing preparation instruction switch in the switch group 9 has been released.

2. The system controller 10 detects that the photographing instruction switch or photographing preparation instruction switch in the switch group 9 has been pressed and then released.

3. The lapse of a predetermined time after the system controller 10 detects that these switches have been released is detected.

As described above, the electronic camera according to the embodiment can perform WB integral processing while recording in the memory 7 the first RAW image data obtained by the image sensing element 3 in normal photographing. The EVF display can quickly start by using status information immediately before actual exposure operation. The electronic camera can execute image processing (white balance processing, conversion processing to YUV data, compression processing, or the like) for the first RAW image data while reading by the image sensing element 3 the second RAW image data obtained next to the first RAW image data. The electronic camera according to the embodiment can shorten the photographing interval in normal image sensing (single shooting), compared to a conventional electronic camera.

<Description of Sequential Shooting>

Figure 4:
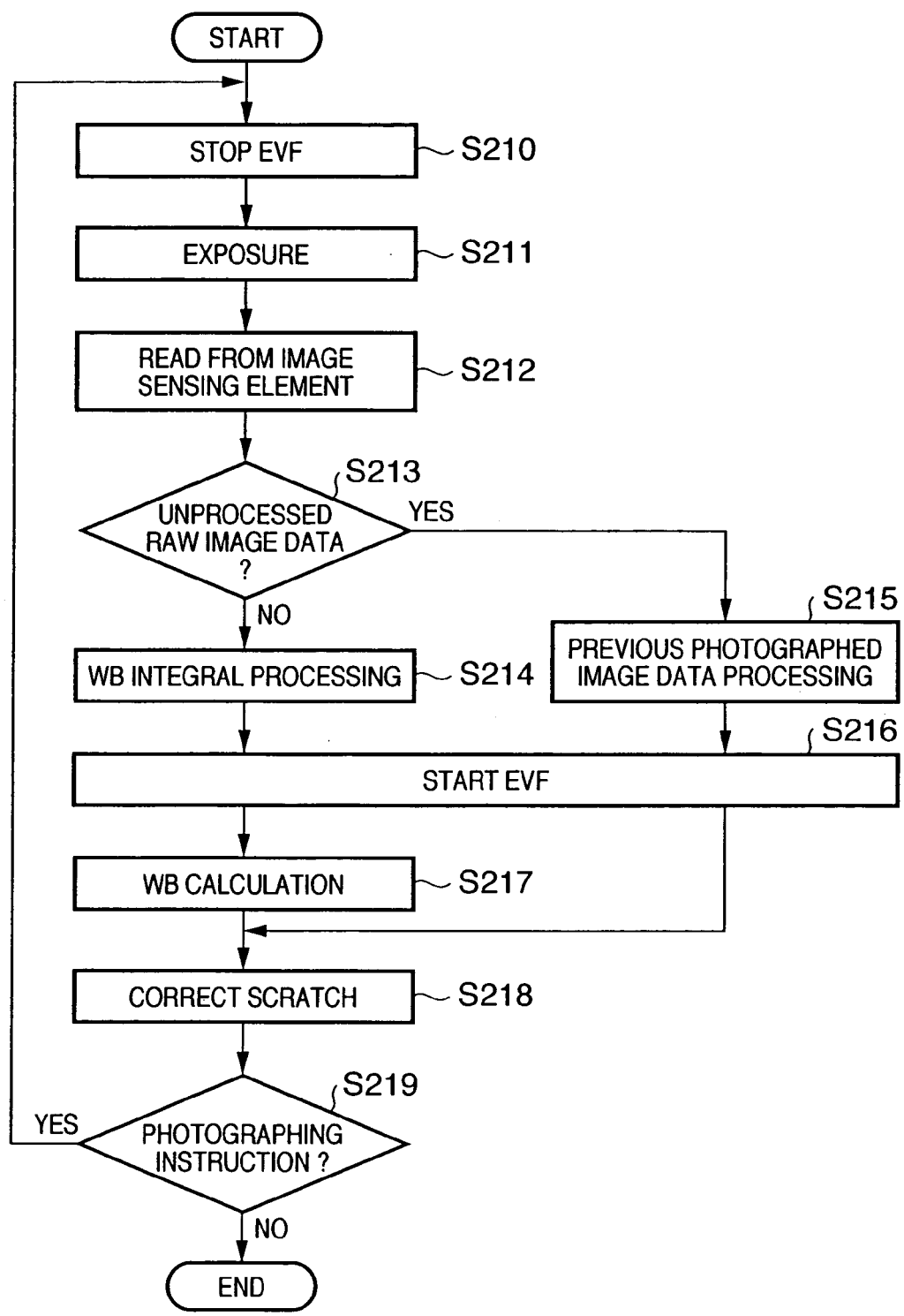
FIG. 4 is a flow chart showing sequential shooting of the electronic camera shown in FIG. 1.

Sequential shooting of the electronic camera shown in FIG. 1 will be explained with reference to the accompanying drawings. FIG. 4 is a flow chart showing sequential shooting of the electronic camera shown in FIG. 1. Processing in FIG. 4 starts on the assumption that the electronic camera is ON and an object image formed on the image sensing element 3 is displayed on the EVF. An operation in the first (first image) photographing of sequential shooting in the electronic camera will be described.

For example, if the user operates the switch group 9 to issue an image sensing/recording instruction to the system controller 10, the electronic camera shown in FIG. 1 starts the following image sensing/recording processing under the control of the system controller 10. As shown in FIG. 4, the electronic camera stops the EVF display in step S210. This is realized by controlling the image processing circuit 6 by the system controller 10 and stopping supply of video data to the image display circuit 8.

In step S211, the system controller 10 drives the shutter 2 to perform exposure. In step S212, the system controller 10 controls the timing generator 11 so as to start read of image signals from the image sensing element 3 after exposure of a proper period. The read image signals undergo various processes such as gain correction and clamping for each color by the signal processing circuit 4. The image signals are A/D-converted by the A/D converter 5, and sequentially stored in either the RAW image data area 71 or 72 of the memory 7 via the image processing circuit 6. The image processing circuit 6 stores RAW image data in the RAW image data area 71 or 72 of the memory 7 without any signal processing or the like. The RAW image data area 71 or 72 of the memory 7 substantially directly stores image data obtained by digitizing an image signal output from the image sensing element 3.

In step S213, the presence/absence of RAW image data which has already been stored in the RAW image data area 71 or 72 of the memory 7 is determined during read from the image sensing element 3. In this case, the first photographing after activation of the electronic camera is assumed. No stored RAW image data exists (NO in step S213), and the processing advances to step S214. In step S214, RAW image data which are sequentially stored in the RAW image data area 71 or 72 of the memory 7 are read out. RAW image data corresponding to the color filters of the image sensing element 3 are integrated by the image processing circuit 6 in order to perform WB processing. WB integral processing data are stored in the memory 7 again.

Figure 6A:
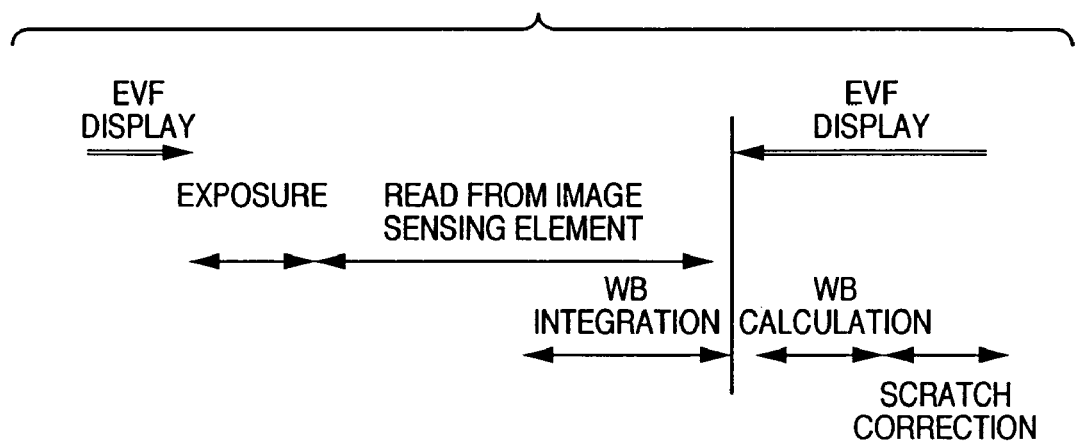
FIGS. 6A and 6B are timing charts showing image sensing processing in sequential shooting in the use of an interlaced read type image sensing element 3.

FIG. 6A is a timing chart showing image sensing processing in the use of an interlaced read type image sensing element 3. As shown in FIG. 6A, in read from the image sensing element 3, data of all pixels serving as a frame are obtained at the start of reading out data from the second field. At this time, WB integral processing starts.

In the use of a non-interlaced read type image sensing element 3, data of all pixels serving as a frame are obtained at the start of reading out RAW image data from the image sensing element 3. At this time, WB integral processing can start. In either case, RAW image data based on an image signal read out from the image sensing element 3 is stored in the RAW image data area 71 or 72 of the memory 7. At the same time, WB integral processing is executed while the stored RAW image data is read out from the same RAW image data area 71 or 72 of the memory 7. The system controller 10 and image processing circuit 6 so control as to prevent read from exceeding write.

At the end of WB integral processing, EVF display processing starts in step S216. At this time, the F-number of the electronic camera, the electronic shutter speed, and the WB coefficient are changed to the same settings as those immediately before photographing. In step S217, the system controller 10 executes WB calculation using WB integral processing data, and determines the WB coefficient of a photographed image.

In step S218, the electronic camera performs processing corresponding to a defective pixel of the image sensing element 3. The image sensing element 3 may include a defective pixel, and this processing compensates for the defective pixel. More specifically, defective pixel data is extracted from RAW image data stored in the RAW image data area 71 or 72 of the memory 7, and corrected. As the defective pixel correction method, various correction methods which are currently available can be preferably adopted. By the above operation, the electronic camera ends photographing operation for the first image data in sequential shooting.

In step S219, the system controller 10 confirms the presence/absence of the next photographing instruction. Since image sensing processing of the first image in sequential shooting has ended, the next image signal instruction exists (YES in step S219), and the processing returns to step S210 in order to sense the second image.

Photographing operation for the second and subsequent images in sequential shooting of the electronic camera shown in FIG. 1 will be explained with reference to FIG. 4.

As described above, the electronic camera stops the EVF display in step S210. The shutter 2 is driven in step S211, and after exposure of a proper period, read of image signals from the image sensing element 3 starts in step S212.

The image signals undergo various processes such as gain correction and clamping for each color by the signal processing circuit 4, and A/D-converted by the A/D converter 5. The image signals are sequentially stored in either the RAW image data area 71 or 72 of the memory 7 via the image processing circuit 6. Assuming that RAW image data of previous photographing are stored in the first area (e.g., RAW image data area 71) out of the RAW image data areas 71 and 72 of the memory 7, RAW image data in photographing of the second image are stored in the second area (e.g., RAW image data area 72).

Figure 6B:
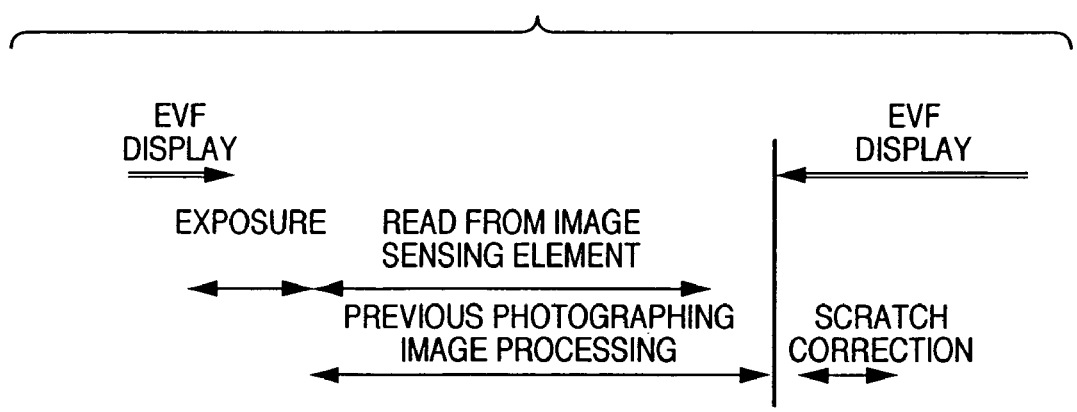
Figure 7:
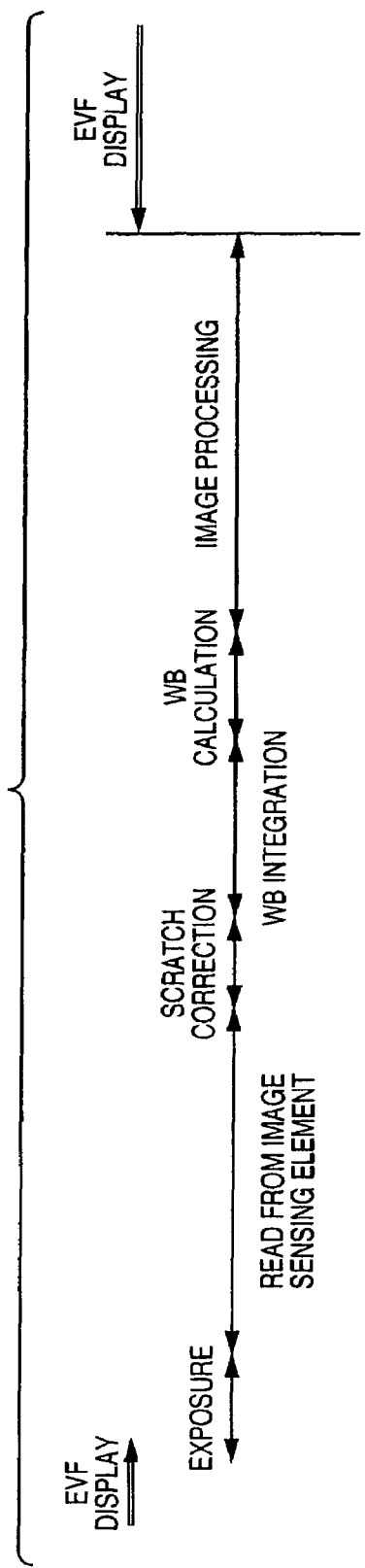
FIG. 7 is a timing chart showing photographing operation of a conventional electronic camera.

In step S213, the presence/absence of RAW image data which has already been stored in the memory 7 is determined during read from the image sensing element 3. Since photographing of the second image is assumed, RAW image data of previous photographing has been stored (YES in step S213). In step S215, the image processing circuit 6 performs image processing for RAW image data obtained in the first photographing. The timing at which the image processing circuit 6 starts image processing for RAW image data in step S215 is determined in accordance with the start of read from the image sensing element 3, as shown in FIG. 6B. As shown in FIGS. 4 and 6B, no WB integral processing is done in the second and subsequent photographing operations. With this setting, white balance processing is unified, and the colors of a series of image data obtained by sequential shooting are also unified.

In the above-described image processing, the same processing as that in step S205 in single shooting is performed.

At the end of both WB integral processing and image processing of RAW image data of previous photographing, the electronic camera starts EVF display processing in step S216. This display processing is achieved by changing the F-number, electronic shutter speed, and WB coefficient to the same settings as those immediately before photographing. In step S218, in order to cope with a defective pixel of the image sensing element 3, RAW image data stored in the RAW image data area of the memory 7 is corrected. Accordingly, the electronic camera ends photographing operation for the second image in sequential shooting.

At this time, RAW image data of the second image has been stored in the RAW data area of the memory 7, and the image file of the first image has been stored in the image file area 73 of the memory 7.

In the above description, image processing for RAW image data of previous photographing is done in step S215. Of this image processing, processing of creating a thumbnail image, addition of various photographing condition data, and processing of storing data in the image file area 73 of the memory 7 may be performed after the start of EVF display processing in step S216. Alternatively, these processes may be performed after any one of steps S216, S217, and S218.

Photographing operation of the electronic camera for the third and subsequent images in sequential shooting is also the same as that for the second image. Since RAW image data of previous (second image) photographing is stored in the second area (e.g., RAW image data area 72) out of the RAW image data areas of the memory 7, RAW image data of the third image is stored in the first area (e.g., RAW image data area 71) out of the RAW image data areas of the memory 7. The electronic camera alternately stores acquired RAW image data in the RAW data areas 71 and 72 of the memory 7.

If the image sensing/recording instruction via the switch group 9 is canceled to the system controller 10 and a series of sequential shooting operations end (NO in step S219), a series of image file data in sequential shooting which have been accumulated in the image file area 73 of the memory 7 are read out, and all the data are recorded on the recording medium 12 via the image processing circuit 6 and recording medium control I/F 13.

If sequential shooting continues, the image file area 73 of the memory 7 may become full in step S215. In this case, the oldest image file in the image file area 73 is read out, and recorded on the recording medium 12 via the image processing circuit 6 and recording medium control I/F 13. This operation is repeated until an image file of at least one image can be stored in the image file area 73, thereby increasing the free space of the image file area 73.

As described above, at the end of photographing of the nth (n is an integer of 1 or more) image, RAW image data of the nth image has been stored in the RAW image data area 71 or 72 of the memory 7 without any processing. Image processing is done for RAW image data of the (n−1)th image that has been stored in the memory 7, and image file data is stored in the image file area 73.

Electronic camera operation for preventing a situation in which, for example, RAW image data stored in the memory 7 is lost (or may be lost) at the end of the above-described sequential shooting is the same as the above-described operation in single shooting, and a description thereof will be omitted.

When the EVF display is stopped in the electronic camera to execute photographing using only an optical viewfinder (not shown), EVF display processing shown in FIG. 4 (step S216) is not executed. In photographing using the optical viewfinder, processing of unprocessed finally photographed image data and recording on the recording medium 12 are done immediately after the end of photographing operation (step S219), or the lapse of a predetermined time after the end of photographing operation, similar to power-off processing. With the above processing, the electronic camera can achieve successive EVF displays in sequential shooting. The user can follow a moving object while monitoring the EVF display in sequential shooting.

As for this embodiment, image data outputted from the A/D converter 5 and uncompressed is used as the RAW data. However, it may also be the lossless-compressed image data. Further, the RAW data may be A/D converted image data, obtained from the image sensing unit, which has not undergone at least any one of white balance processing, color separation processing of separating the image data to a luminance signal and color signals, and color interpolation from color plane data.

The embodiment has exemplified the electronic camera as an image sensing apparatus. However, the present invention is not limited to this, and can be applied to various apparatuses having a function of sensing a still image.

The embodiment of the present invention has been described in detail with reference to the accompanying drawings. A concrete arrangement is not limited to the embodiment, and also includes a design within the spirit and scope of the invention.

For example, the present invention can also be achieved when software program codes for realizing the functions of the above-described embodiment are supplied to the image sensing apparatus via a network such as the Internet, and the computer (or the CPU or MPU) of the image sensing apparatus reads out and executes the program codes stored in the storage medium.

In this case, the program codes read out from the storage medium realize the functions of the system controller 10 according to the above-described embodiment, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, and ROM.

The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

Furthermore, the functions of the above-described embodiment are realized when the program codes read out from the storage medium are written in the memory of a function expansion board inserted into the computer or the memory of a function expansion unit connected to the computer, and then the CPU of the function expansion board or function expansion unit performs part or all of actual processing on the basis of the instructions of the program codes.

When the present invention is applied to the storage medium, the storage medium stores program codes corresponding to the above-described flow charts. In short, at least modules indispensable to the image sensing apparatus of the present invention are stored in the storage medium.

As has been described above, according to the above embodiment, an object image can be displayed on the electronic viewfinder (display device) immediately after photographing. The user can quickly follow the object through the electronic viewfinder, obtaining comfortable operability. This can prevent a miss of a shutter chance due to slow display of an object image.

The present invention is not limited to the above embodiments and various changes and modifications can be made within the spirit and scope of the present invention. Therefore, to apprise the public of the scope of the present invention the following claims are made.

What is claimed is:

1. An image sensing apparatus comprising:
an image sensing device which outputs image data obtained by an image sensing element as RAW data;
a memory which has a first area for temporarily storing first RAW data obtained in a first image sensing operation of said image sensing device and a second area for temporarily storing second RAW data obtained in a second image sensing operation next to the first image sensing operation of said image sensing device;
a white balance integration device which integrates at least one of the first and second RAW data readout from said first area and said second area, respectively, for a white balance processing;
a white balance calculation device which calculates a white balance coefficient on the basis of the integration result by the white balance integration device;
an image processing device which performs image processing of the first and second RAW data readout from said first area and said second area, respectively, in accordance with the white balance coefficient calculated by said white balance calculation device
a display device which displays a live view image during imaging on the image sensing element; and
a control device which controls said memory, said white balance integration device, said image processing device, and said display device,
wherein, said control device controls so that, said image processing device processes a color space conversion for the first RAW data readout from said first area in accordance with start of reading the second RAW data from the image sensing element in the second image sensing operation, the white balance integral processing for the second RAW data by said white balance integration device and the color space conversion for first RAW data by said image processing device processes are performed in parallel during reading of the second RAW data from the image sensing element, said display device is inhibited from displaying the live view image during the integral processing for the second RAW data and after the integral processing for the second RAW data is finished but the color space conversion processing for the first RAW data is not finished, said display device is started to display the live view image in response that the color space conversion processing for the first RAW data is finished after the integral processing for the second RAW data is finished, and said white balance calculation device calculates the white balance coefficient of the second RAW data after said display device starts to display the live view image.

2. The apparatus according to claim 1, further comprising a defect correction device which corrects a defective pixel portion of image data when the image sensing element has a defective pixel,
wherein said control device controls said defect correction device in such a way that said defect correction device corrects a defective pixel portion of the image data while said display device displays the object image after said white balance calculation device calculates the white balance coefficient.

* * * * *